Figure 1:
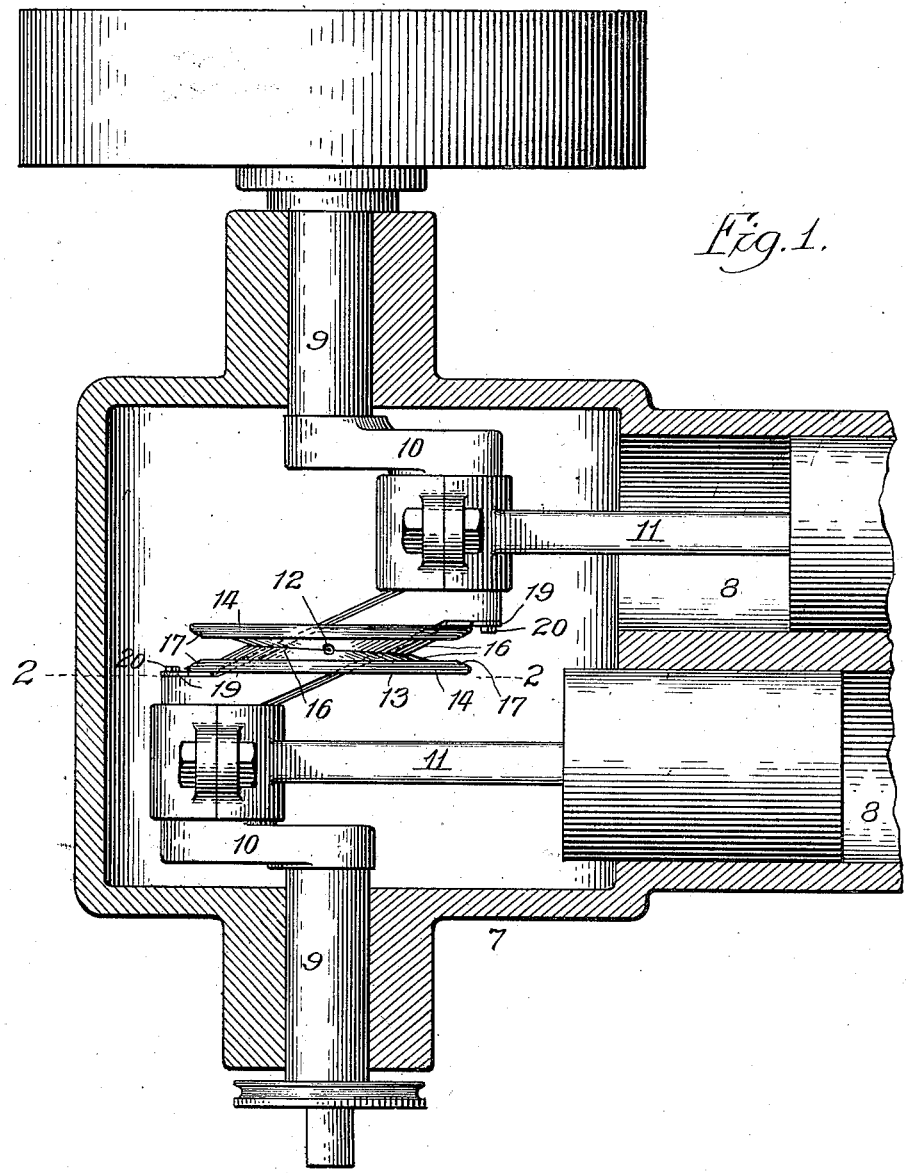

L. F. EASTON.
LUBRICATING DEVICE FOR ENGINES.
APPLICATION FILED MAR. 16, 1918.

1,293,382.

Patented Feb. 4, 1919.
2 SHEETS—SHEET 1.

Witness:
John Enders

Inventor:
Lucian F. Easton
by Fred Gerlach
his Atty.

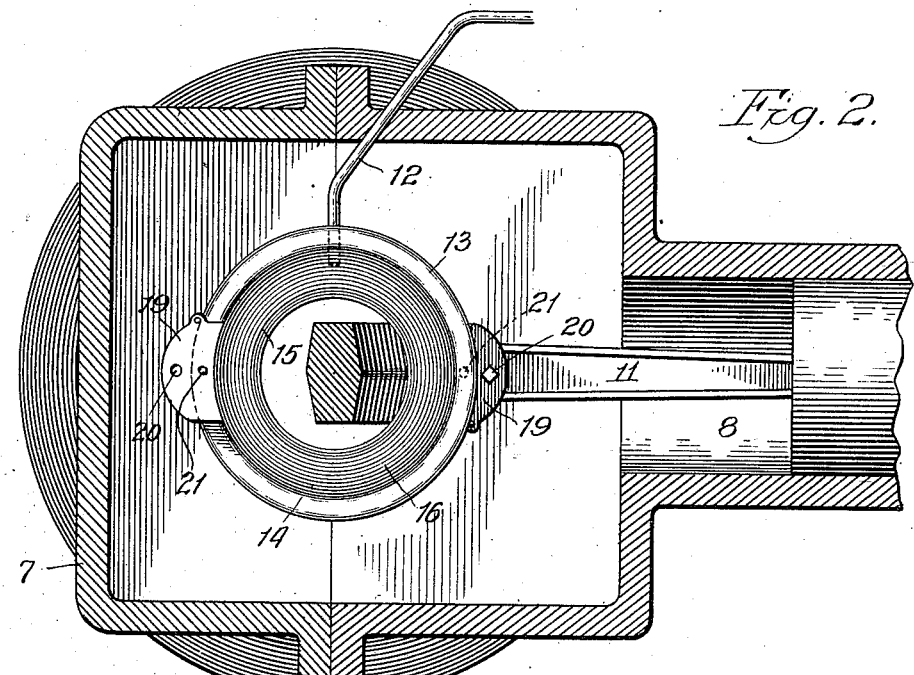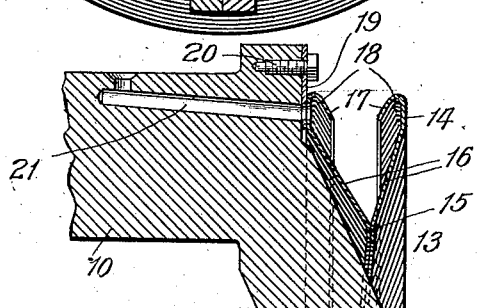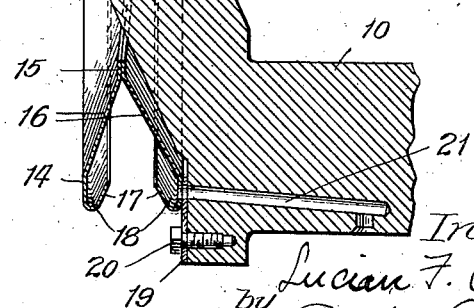

UNITED STATES PATENT OFFICE.

LUCIAN F. EASTON, OF LA CROSSE, WISCONSIN, ASSIGNOR TO LA CROSSE TRACTOR CO., OF LA CROSSE, WISCONSIN, A CORPORATION OF DELAWARE.

LUBRICATING DEVICE FOR ENGINES.

1,293,382.     Specification of Letters Patent.     Patented Feb. 4, 1919.

Application filed March 16, 1918. Serial No. 222,871.

*To all whom it may concern:*

Be it known that I, LUCIAN F. EASTON, a citizen of the United States, and a resident of La Crosse, in the county of La Crosse and State of Wisconsin, have invented certain new and useful Improvements in Lubricating Devices for Engines, of which the following is a full, clear, and exact description.

The invention relates to lubricating devices for engines.

It has heretofore been proposed to use a grooved distributing ring to conduct lubricant to the wrist pins of the crank-shaft to lubricate the connection between the pitmen and the cranks. These rings have been V-shaped or flared outwardly, with a view of distributing lubricant deposited centrally or in the deepest portion of the groove, to both sides of the ring. In practice, it has been found that when the engines are used on tractors or other vehicles, even distribution of the lubricant does not result, because of the constant variation in the inclination or departure from the horizontal of the vehicle, which results from traveling over inclines or obstructions.

One object of the invention is to provide an improved lubricating device of this character in which provision is made for distribution of the oil to both of the cranks, despite inclination or variation of the crank shaft or engine. This object is attained by forming the ring with an irregular groove or one in which the different portions thereof are disposed at different points longitudinally of the crank-shaft, so that the oil dropping or discharged onto the ring will alternately direct the drops of oil to the opposite sides for conduction to the cranks. By means of this construction, the oil is distributed between the cranks even though the crank shaft and engine be inclined.

The invention consists in the several novel features hereinafter set forth and more particularly defined by claims at the conclusion hereof.

In the drawings: Figure 1 is a horizontal section of an explosive engine embodying the invention. Fig. 2 is a section taken on line 2—2 of Fig. 1. Fig. 3 is a detail longitudinal section of the improved distributing ring and the crank-shaft.

The invention is illustrated as applied to an engine comprising a crank-case 7 provided with cylinders 8 and a shaft 9 provided with oppositely disposed cranks 10, to each of which is connected a pitman 11 which is operated by one of the pistons in the cylinders, as well understood in the art.

The lubricant is conducted into the crank-case by any suitable means, such as a pipe 12, to which the oil may be supplied in regulated quantity by a pump or other suitable means for the purpose of lubricating the cranks, as well understood in the art. The pipe 12 is disposed to deliver the oil into the crank case at a point located longitudinally between the cranks 10—10 and into a distributing ring 13. This ring is preferably formed of sheet metal members 14 for convenience in manufacture. These members are provided with abutting flanges 15 which have their inner faces welded together, and each has an outwardly inclined or flared side wall 16, and an inturned trap-flange or wall 17. The inturned flange forms a retaining groove 18 for the lubricant. Each member 16 of the distributing ring has its outer face welded to a plate 11 and these plates are respectively secured to the inner sides of the cranks 10 by screws 20. A duct 21 extends through the side wall of one member of the ring, the attached side plate and the crank, to which the plate is connected for the purpose of conducting lubricant from one groove 18 to one of the wrist-pins, and a similar duct leads from the other ring member to the periphery of the other crank. The flared formation of the ring members forms, in effect, a V-shaped receiving groove in the ring, each side of which is adapted to direct lubricant to one of the ducts 21. In lieu of forming the meeting edges of the members 14 so they will lie in a plane perpendicular to the axis of the crank-shaft, they are inclined relatively to that axis so that the different portions of the receiving groove in the distributing ring will be disposed at different longitudinal points, so that oil from the feed pipe will be fed alternately onto one side of the ring and then to the other, in lieu of being dropped at the deepest or central portion of the groove when the engine is level, and all of the oil on one of the rings, when the engine is inclined.

In operation, oil from the feed pipe 12 will be deposited into the receiving groove of the lubricating ring and as a result of longitudinally offsetting different portions of the ring, some of the oil will drop onto one member of the ring and be conducted outwardly by centrifugal force on the wall 16 thereof to one of the cranks and at other times the oil will be deposited on the other ring member and be similarly conducted to the other crank, the grooves 18 serving to guide the oil into the outlets 21. This distribution of the oil occurs, notwithstanding inclination of the engine.

The invention exemplifies an improved distributing ring whereby distribution of the oil between the adjacent cranks is insured.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. The combination with a shaft provided with cranks, of an oil distributing ring disposed between the cranks and grooved to receive and conduct oil to the sides thereof, the groove having portions relatively offset longitudinally of the axis of the shaft, and means for delivering oil to the ring.

2. The combination with a shaft provided with cranks, of an oil distributing ring disposed between the cranks having flared sides formed to receive and conduct oil to the sides thereof, and retaining grooves, the receiving groove having portions varyingly inclined to alternately distribute the lubricant to the retaining grooves, and means for delivering oil to the ring.

3. The combination with a shaft provided with cranks, of an oil distributing ring disposed between the cranks and formed of flared members having inner flanges welded together, forming a groove to receive and conduct oil to the sides thereof and having retaining grooves, the receiving groove having portions relatively offset longitudinally of the axis of the shaft, plates welded to the members, and means for delivering oil to the ring.

4. The combination with a pair of rotatable cranks, of an oil distributing ring disposed between the cranks, having sides forming a receiving groove formed so that the line of their intersection does not wholly lie in the plane of revolution, the sides being provided with oil-retaining grooves adjacent their peripheries, means for supplying lubricant to the receiving groove, and means for conducting oil from the retaining grooves to the cranks respectively.

LUCIAN F. EASTON.